US008660763B2

(12) United States Patent
Peterson et al.

(10) Patent No.: US 8,660,763 B2
(45) Date of Patent: Feb. 25, 2014

(54) SYSTEM AND METHOD FOR MACHINE CONTROL WITH RATE LIMITING

(75) Inventors: Grant S. Peterson, Metamora, IL (US); Randall T. Anderson, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 533 days.

(21) Appl. No.: 12/982,685

(22) Filed: Dec. 30, 2010

(65) Prior Publication Data
US 2012/0173101 A1 Jul. 5, 2012

(51) Int. Cl.
*B60W 50/06* (2006.01)
*G06F 7/00* (2006.01)

(52) U.S. Cl.
USPC .......................................................... 701/54

(58) Field of Classification Search
USPC ................ 701/50–56; 477/34, 70; 180/170–1
See application file for complete search history.

(56) References Cited

U.S. PATENT DOCUMENTS

| | | | |
|---|---|---|---|
| 4,368,798 A | 1/1983 | Meyerle et al. | |
| 4,768,636 A | 9/1988 | Ito et al. | |
| 4,836,056 A | 6/1989 | Nakawaki et al. | |
| 5,529,546 A | 6/1996 | Ishino et al. | |
| 5,658,217 A | 8/1997 | Tsukada | |
| 5,875,680 A | 3/1999 | Lorriette | |
| 6,223,111 B1 | 4/2001 | Cronin et al. | |
| 6,413,189 B1 | 7/2002 | Spiess et al. | |
| 6,811,015 B2 | 11/2004 | Tietze | |
| 6,910,988 B2 | 6/2005 | Carlsson | |
| 7,390,282 B2 | 6/2008 | Shah | |
| 7,641,586 B2 | 1/2010 | Wild et al. | |
| 2008/0035444 A1* | 2/2008 | Schiele et al. | 192/219.5 |
| 2010/0107996 A1* | 5/2010 | Shintani et al. | 123/41.11 |

FOREIGN PATENT DOCUMENTS

| | | |
|---|---|---|
| JP | 2000319940 | 11/2000 |
| KR | 1019980009827 | 4/1998 |
| KR | 100611714 | 8/2006 |
| KR | 1020080055555 | 6/2008 |

* cited by examiner

*Primary Examiner* — Yonel Beaulieu
(74) *Attorney, Agent, or Firm* — Finnegan, Henderson, Farabow, Garrett & Dunner LLP; Jeff A. Greene

(57) ABSTRACT

A machine control system may include a processor configured to communicate with an operator interface including an acceleration pedal and a forward-neutral-reverse selector, a power source, and a transmission assembly. The processor may be configured to obtain a request from the forward-neutral-reverse selector. The processor may also be configured to provide an instruction for adjusting operation of the transmission assembly in response to the forward-neutral-reverse selector request. The process may also be configured to obtain a request for an increase in a speed of the power source at a first rate. The power source speed request may be based on a position of the acceleration pedal. The processor may also be configured to provide an instruction for increasing the power source speed at a second rate slower than the first rate. This may provide the transmission assembly with time to respond to the forward-neutral-reverse selector request by switching from one of a forward travel state, a neutral state, and a reverse travel state, to another of the forward travel, neutral, and reverse travel states.

20 Claims, 7 Drawing Sheets

SYSTEM AND METHOD FOR MACHINE CONTROL WITH RATE LIMITING

TECHNICAL FIELD

This disclosure relates generally to a machine control system, and more particularly, to a machine control system that performs rate limiting on a speed of a power source.

BACKGROUND

A machine including, for example, a loader, a tractor, or other type of heavy machinery, may be used for performing a variety of tasks. An operator may use an operator interface to control components of the machine including, for example, an engine, a transmission, an implement, and a traction assembly. The machine may also include a control system to provide assistance for controlling the machine components.

While operating the machine, the operator may request that the machine change its direction of travel from a current direction to a new direction. The current direction may be a forward direction and the new direction may be a reverse direction, or vice versa. At other times, the operator may request that the machine be put in a neutral state from a state where the machine is propelled in a direction of travel. To change the machine's direction of travel, or put the machine in the neutral state, the operator may decelerate the machine. The operator may also select the new direction or the neutral state. In some instances, the operator may attempt to quickly accelerate the machine in the new direction, or in the neutral state, by requesting an increase in engine speed. It is possible for the machine to temporarily accelerate in the wrong direction during the direction change process, or accelerate in a travel direction during the process of putting the machine in the neutral state, in response to the operator's request for an increase in engine speed. This is due to the response of the engine to the operator's request being faster than the response of the transmission to the selection of the new direction or neutral state. Unintended or undesired acceleration may be detrimental to machine performance.

The disclosed system and method is directed at overcoming one or more of the problems set forth above, as well as other problems known in the art.

SUMMARY

According to an aspect of the present disclosure, a machine control system may include a processor configured to communicate with an operator interface including an acceleration pedal and a forward-neutral-reverse selector, a power source, and a transmission assembly. The processor may be configured to obtain a request from the forward-neutral-reverse selector. The processor may also be configured to provide an instruction for adjusting operation of the transmission assembly in response to the forward-neutral-reverse selector request. The process may also be configured to obtain a request for an increase in a speed of the power source at a first rate. The power source speed request may be based on a position of the acceleration pedal. The processor may also be configured to provide an instruction for increasing the power source speed at a second rate slower than the first rate. This may provide the transmission assembly with time to respond to the forward-neutral-reverse selector request by switching from one of a forward travel state, a neutral state, and a reverse travel state, to another of the forward travel, neutral, and reverse travel states.

According to another aspect of the present disclosure, a machine control method for a machine including an operator interface with an acceleration pedal and a forward-neutral-reverse selector, a power source, and a transmission assembly, is disclosed. The method may include obtaining a request from the forward-neutral-reverse selector. The method may also include adjusting operation of the transmission assembly in response to the forward-neutral-reverse selector request. The method may also include obtaining a request for an increase in a speed of the power source at a first rate. The power source speed request may be based on a position of the acceleration pedal. The method may also include limiting a response to the power source speed request by increasing the power source speed at a second rate slower than the first rate until the machine stops.

According to yet another aspect of the present disclosure, a machine may include an operator interface. The operator interface may include an acceleration pedal, and a forward-neutral-reverse selector. The machine may also include a power source, a transmission assembly, and a control system. The control system may be configured to obtain a command from the forward-neutral-reverse selector. The control system may also be configured to adjust operation of the transmission assembly in response to the forward-neutral-reverse selector command. The control system may also be configured to obtain a request for an increase in a speed of the power source at a first rate. The request may be based on a position of the acceleration pedal. The control system may also be configured to increase the speed of the power source at a second rate slower than the first rate until the machine stops.

DETAILED DESCRIPTION

The present disclosure is used in a machine. In the embodiment described below, a wheel loader machine 10 is disclosed. However, it can be appreciated that other types of machines can benefit from the embodiments disclosed herein, including, for example, any type of ground-borne vehicle, such as an automobile, a truck, an agricultural vehicle, and/or a construction vehicle, such as, a track loader, a dozer, a tractor, an excavator, a grader, an on-highway truck, an off-highway truck, and/or any type of machine known to persons skilled in the art.

Figure 1:
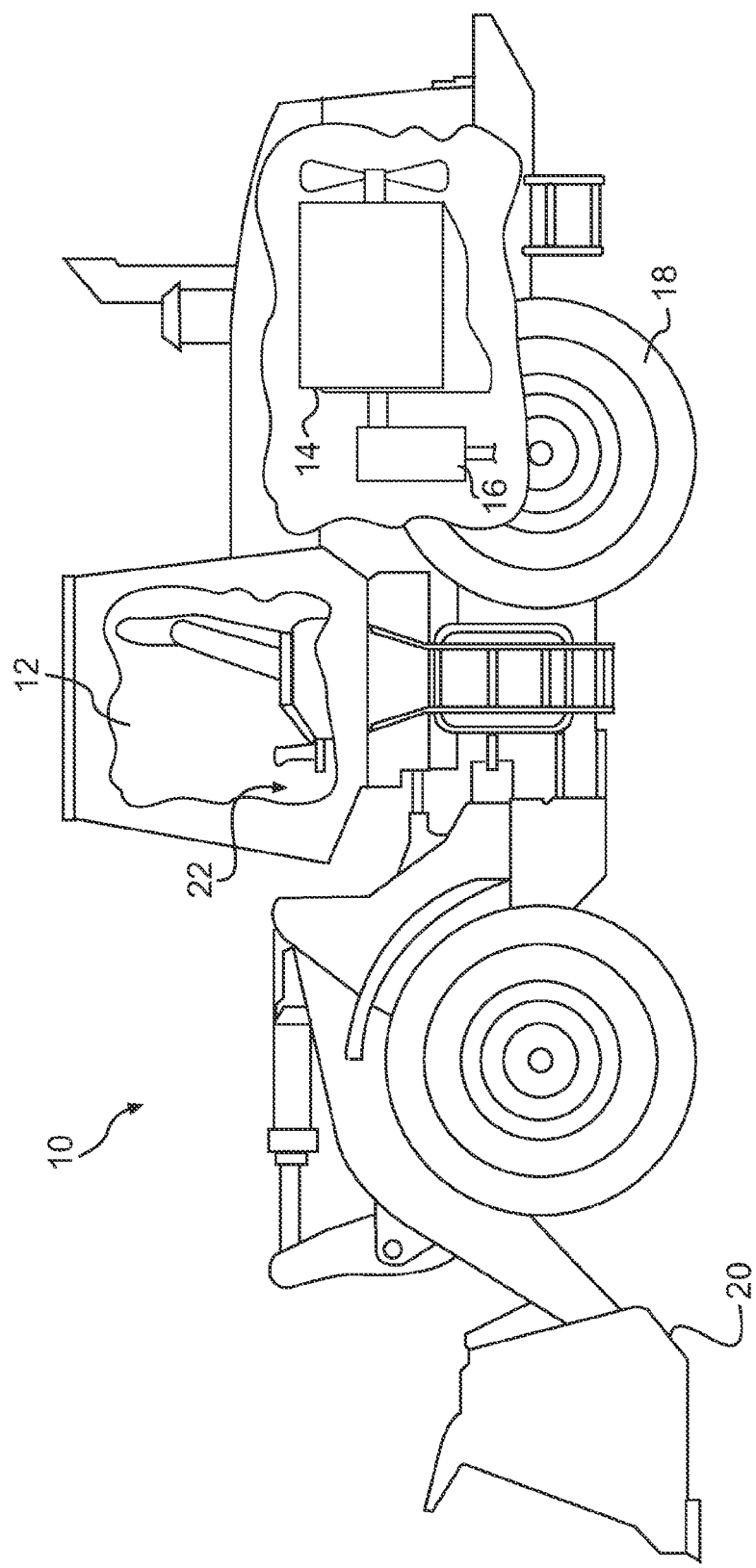
FIG. 1 is a side view of a machine, according to one aspect of the present disclosure.

As shown in FIG. 1, machine 10 includes an operator station 12, a power source 14, a transmission assembly 16, a traction assembly 18, an implement assembly 20, as well as other machine components known to persons skilled in the art. Each of these machine components will now be described.

Figure 2:
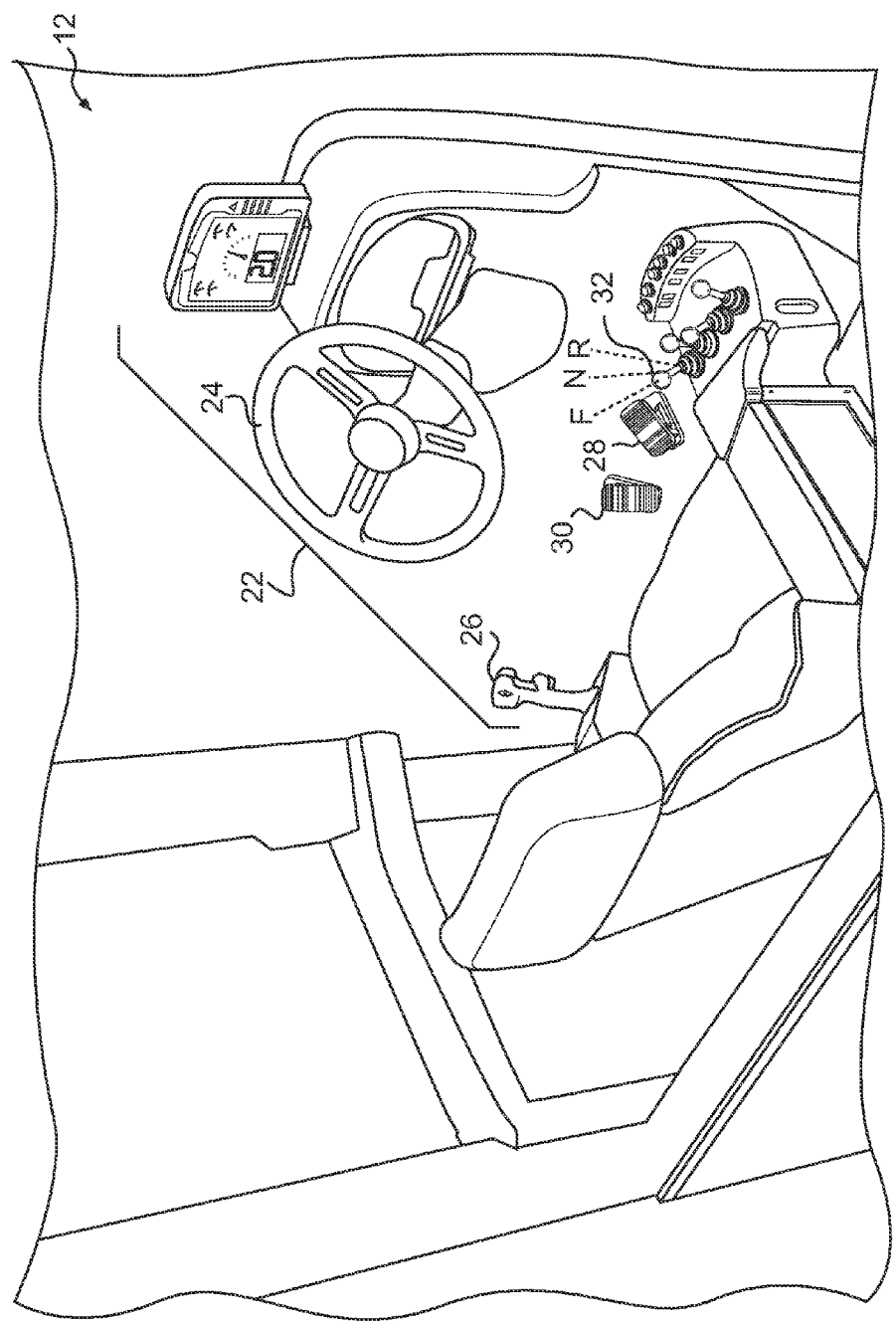
FIG. 2 is a perspective view of an interior of an operator station, according to one aspect of the present disclosure.

As illustrated in FIG. 2, operator station 12 includes an operator interface 22. Operator interface 22 includes devices capable of being manipulated by a machine operator to produce signals, requests, and/or commands that are indicative of desired machine travel, maneuvers, and/or control. In one embodiment, operator interface 22 includes a steering device 24, a joystick 26, an acceleration or throttle pedal 28, a deceleration or braking pedal 30, and a forward-neutral-reverse (FNR) selector 32. It should be understood that any other control devices known to persons skilled in the art may be included in operator interface 22.

As the operator manipulates deceleration pedal 30 by, for example, applying pressure to deceleration pedal 30, the operator may expect and effect a corresponding retardation in the propulsion or travel of machine 10. As the operator manipulates acceleration pedal 28 by depressing acceleration pedal 28, on the other hand, the operator may expect and effect a corresponding increase in the propulsion or travel of machine 10. As the operator releases pressure on the acceleration pedal 28, retardation in the propulsion or travel of machine 10 may also be expected and produced.

FNR selector 32 may allow the operator to selectively place machine 10 in a forward travel mode, a neutral mode, and a reverse travel mode. As shown in FIG. 2, FNR selector 32 may be a lever movable through three positions corresponding to forward travel mode, neutral mode, and reverse travel mode. When FNR selector 32 is in the forward travel position, power from power source 14 may be converted into forward movement of traction assembly 18. When FNR selector 32 is in the reverse travel position, power from power source 14 may be converted into reverse movement of traction assembly 18. And when FNR selector 32 is in the neutral position, power source 14 may be decoupled from traction assembly 18, but power from power source 14 may continue to be converted into movement of implement assembly 20.

Power source 14 may respond to inputs from operator interface 22, as well as to other inputs known to persons skilled in the art. Power source 14 may respond to inputs by, for example, speeding up, slowing down, or maintaining speed. Power source 14 may include, for example, an internal combustion engine, including but not limited to a spark-ignition engine, a compression ignition engine, a rotary engine, a gas turbine engine, and/or an engine powered by gasoline, diesel fuel, bio-diesel, ethanol, methanol, and combinations thereof. Power source 14 may also include a hydrogen-powered engine, a fuel cell, a solar cell, and/or any other power source known to persons skilled in the art.

Figure 3:
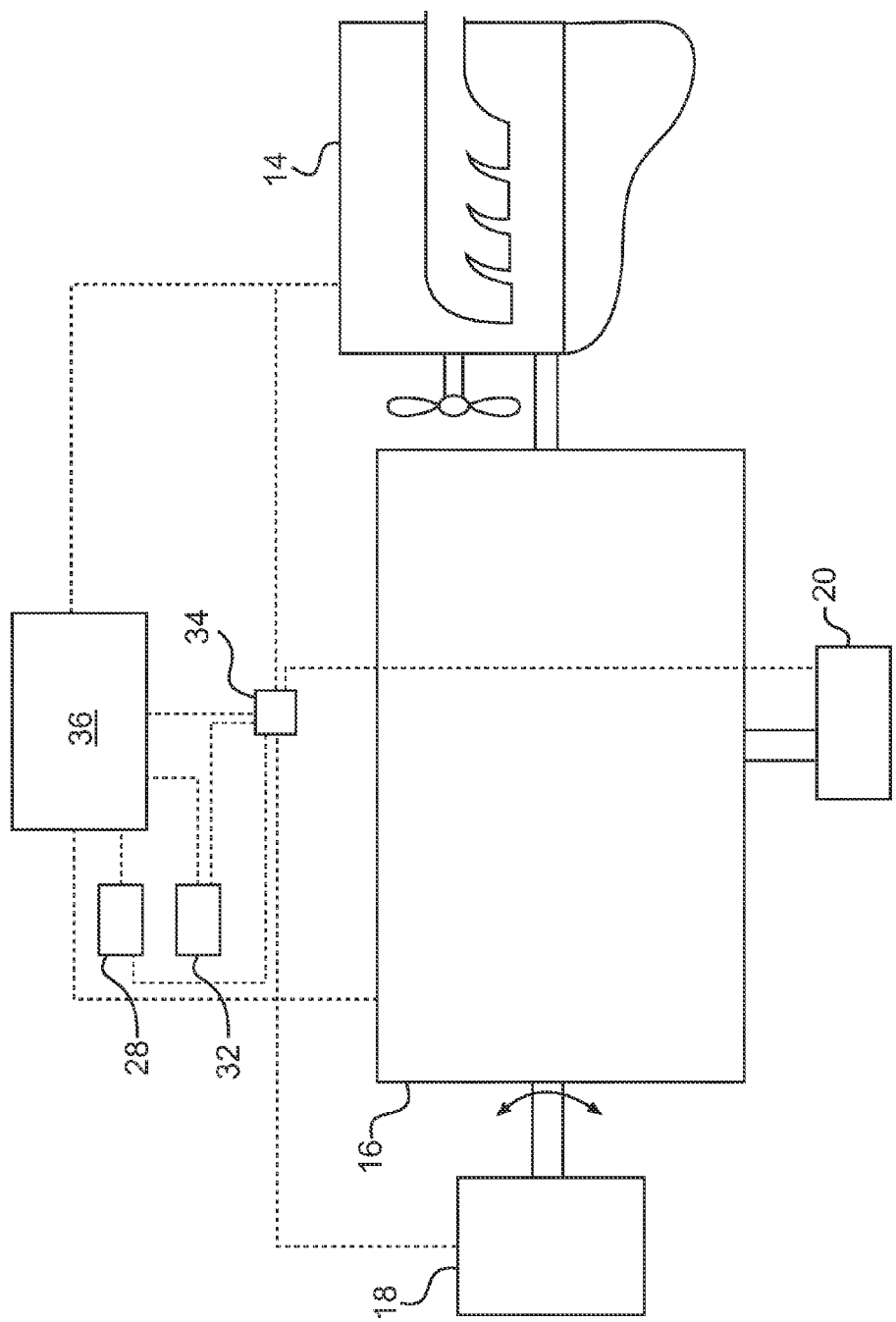
FIG. 3 is a schematic drawing of a control system, power train, and powered components, according to one aspect of the present disclosure.

Power source 14 and transmission assembly 16 are operatively coupled, as shown in FIGS. 1 and 3, and together form a power train. Transmission assembly 16 may be configured to convert rotational motion of power source 14 into rotational motion that is used to drive traction assembly 18. Traction assembly 18 includes at least one traction device, such as a wheel, track, or any other suitable traction device or combination of traction devices known in the art. Transmission assembly 16 may include an electrohydraulic single path hydrostatic transmission, an electrohydraulic multipath hydrostatic transmission, and/or any other transmission known to those skilled in the art. A hydrostatic transmission may include, for example, a pump and a fluid motor that are fluidly coupled by a forward flow loop and a reverse flow loop. The pump can convert rotational motion of power source 14 into fluid flow, and the fluid motor can convert the fluid flow back into rotational motion that is used to drive traction assembly 18. Fluid flow and pressure in the hydrostatic transmission may be servo-controlled or otherwise electronically controlled by any suitable control system.

Transmission assembly 16 may also convert rotational motion of power source 14 into movement of implement assembly 20. Implement assembly 20 may be used to perform a variety of tasks including, for example, digging, dumping, lifting, scraping, and other tasks known to those skilled in the art. Numerous different implements may be attachable to machine 10 and may be controlled via operator station 12. Implement assembly 20 may include any device used to perform tasks such as, for example, a bucket, a fork arrangement, a blade, a shovel, or any other task-performing device known to those skilled in the art.

Machine 10 also includes one or more sensors 34. Sensors 34 may be located throughout machine 10, and may provide information related to machine 10. In one embodiment, sensors 34 are operable to provide signals indicative of parameters related to operator interface 22, power source 14, transmission assembly 16, traction assembly 18, implement assembly 20, as well as other machine components known to persons skilled in the art. For example, sensors 34 may provide signals indicative of operating parameters related to transmission assembly 16, including fluid pressure, fluid temperature, displacement, speed, and/or any other suitable operating parameters. Sensors 34 may also be operable to provide signals indicative of operating parameters related to power source 14, including, for example, power source speed. It is also contemplated that sensors 34 may provide signals indicative of the position of acceleration pedal 28, FNR selector 32, and/or implement assembly 20. Such signals may be in the form of digital, analog, mechanical, and/or hydraulic signals.

Machine 10 also includes a control system 36 operatively coupled to operator station 12, power source 14, transmission assembly 16, traction assembly 18, and/or sensors 34. Control system 36 may include one or more processors, microprocessors, central processing units, on-board computers, electronic control modules, and/or any other computing and control devices known to those skilled in the art. Control system 36 may run one or more software programs or applications stored in a memory location, read from a computer readable medium, and/or accessed from an external device operatively coupled to the control system 36 by any suitable communications network.

Control system 36 is configured to control operation of machine components. For example, control system 36 is operable to control transmission assembly 16. Control system 36 is also operable to control power source 14 by supplying control signals to power source 14 to affect air intake, fuel injection, and any other suitable aspects of power source performance known by those skilled in the art. Such signals may be in the form of digital, analog, mechanical, and/or hydraulic signals.

The operator may exercise control over machine 10 from operator station 12 using operator interface 22 and control system 36 to control machine components. For example, during operation of machine 10, the operator may want to change the machine's direction of travel. That is, the operator may want to stop machine 10 from traveling in a first direction and start propelling machine 10 in a second direction substantially opposite the first direction. For example, the operator may want to stop machine 10 from traveling in a forward direction and start propelling machine 10 in a reverse direction, or vice versa.

In order to change the machine's direction of travel, the operator may perform a variety of actions. If the operator is manipulating acceleration pedal 28 to propel machine 10 in the first direction when the decision to change direction is made, the operator may remove pressure from or otherwise release acceleration pedal 28. With acceleration pedal 28 released, machine 10 may begin to decelerate while continuing to move in the first direction. If the operator is not manipulating acceleration pedal 28 to propel machine 10 in the first direction when the decision to change direction is made, releasing acceleration pedal 28 is not required.

Figure 6:
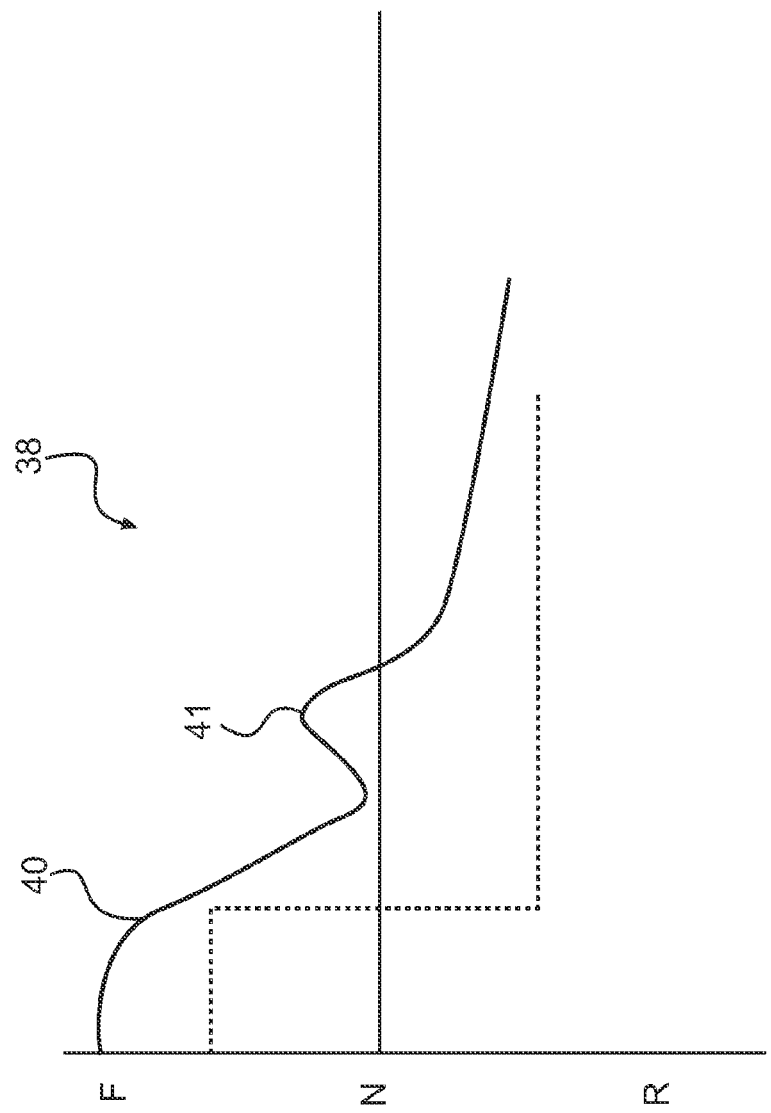
FIG. 6 is a graph showing unintended or undesired acceleration of a machine in a direction of travel.

The operator may switch FNR selector 32 from forward travel mode to reverse travel mode, or vice versa, to set up transmission assembly 16 for the direction change. It should be understood that during the switch, the operator may place FNR selector 32 in the neutral mode for a period of time. So that machine 10 may quickly begin moving in the second direction, the operator may apply pressure on acceleration pedal 28 during and/or after switching modes to increase the speed of (accelerate) power source 14. In some machines, this power source acceleration may lead to undesired or unintended acceleration of machine 10 in the first direction before travel in the second direction begins. Undesired or unintended acceleration of machine 10 is shown in graph 38 of FIG. 6. In graph 38, a portion 41 of a machine travel curve 40 shows that after the travel mode has been changed from forward "F" to reverse "R", unintended or undesired acceleration of machine 10 has occurred in the forward "F" direction.

Control system 36 may prevent the above-described pattern of direction change events from causing undesired or unintended acceleration of machine 10 in the wrong direction. In order to avoid undesired or unintended acceleration of machine 10 in the wrong direction, control system 36 may limit the response of the power source 14 during a change in the direction of machine travel from the first direction to the second direction. When the operator reapplies pressure to acceleration pedal 28 after switching the FNR selector 32 away from the mode associated with the first direction (and to neutral mode, and then to the mode associated with the second direction), the speed of power source 14 may increase at a slower rate than it otherwise would. Rate limiting slows the response of power source 14 enough to provide transmission assembly 16 with a sufficient amount of time to respond to the change in direction, and to prepare to propel machine 10 in the second direction.

Figure 7:
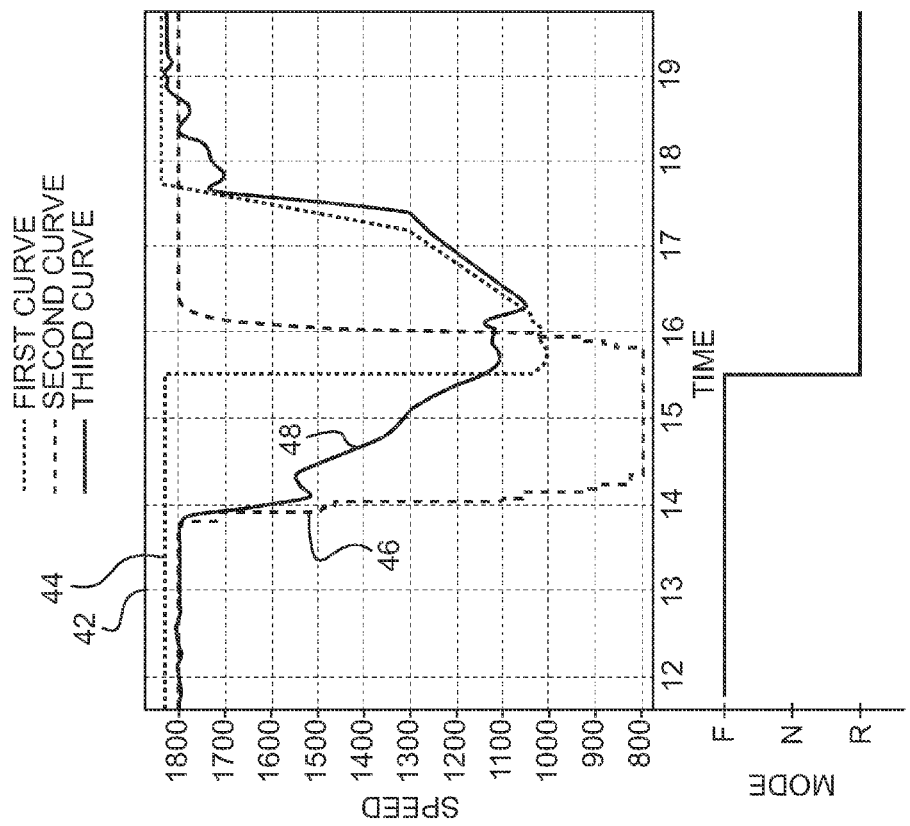
FIG. 7 is a graph showing speed curves, according to one aspect of the disclosure.

The graph 42 shown in FIG. 7 depicts rate limiting being performed during a period of time. In graph 42, a first curve 44 represents rate limited speeds over a period of time that may be used to limit the actual speed of power source 14 at points in time discussed below. The rate limited speeds are speeds below which undesired or unintended acceleration of machine 10 in the wrong direction will not occur. The rate limited speeds may be based on historical performance data, test data, one or more look-up tables, model data, and/or any other suitable source of machine information. A second curve 46 represents requested speed for power source 14 (requested by the operator), during the period of time. The values making up second curve 46 may be based on a position of acceleration pedal 28. A third curve 48 represents actual speed of power source 14 over the period of time. These curves 44, 46, and 48 show how control system 36 performs rate limiting to avoid unintended or undesired acceleration in the wrong direction.

During a first or "normal" state of operation of machine 10, rate limiting by control system 36 may not be necessary. The first state of operation may correspond to the absence of conditions where acceleration of machine 10 in the wrong direction may occur. The first state of operation is represented by portions of second curve 46 and third curve 48 in the time period between approximately 12 and 13.8. The proximity of second curve 46 to third curve 48 indicates that control system 36 is seeking to keep the actual speed of power source 14 at or near the operator requested speed for power source 14.

During the first state of operation, rate limiting features of control system 36 may be turned off. Alternatively, the rate limiting features may be active, but may be set to avoid interfering with the actual and requested speeds. For example, a portion of first curve 44, which is made up of rate limited speeds, is kept above second curve 46 and third curve 48 in the time period between approximately 12 and 15.5, indicating that the rate limited speeds are not performing limiting on the actual or requested speeds during the first state of operation. Control system 36 may continue to operate in the first state of operation until triggering conditions for rate limiting are met.

In order to change the direction of travel of machine 10, the operator may release acceleration pedal 28 to decelerate machine 10 so that machine 10 may be slowed down and stopped and then propelled in the reverse direction. The release of acceleration pedal 28 is recognized by control system 36 as a decrease in the requested speed of power source 14, and is represented by a decreasing portion of second curve 46 in the period of time between approximately 13.8 and 14.4 in graph 42. The release of acceleration pedal 28 leads to a gradual decrease in the actual speed of power source 14, represented by a decreasing portion of third curve 48 in the period of time between approximately 13.8 and 15.5 in graph 42. When the actual power source speed minus a predetermined value or offset is greater than the requested power source speed, control system 36 will recognize that a first triggering condition has been met. The first triggering condition is met, for example, when power source 14 is being back driven by traction assembly 18, and/or machine 10 is decelerating and/or power source 14 is being back driven by transmission assembly 18, since machine deceleration and/or back driving may increase the actual power source speed and/or prevent the actual power source speed from decreasing as quickly as the requested power source speed. Power source 14 is back driven when traction assembly 18 provides power to power source 14 through transmission assembly 16.

To proceed with the change in direction, the operator also moves FNR selector 32 from forward travel mode to reverse travel mode, or from reverse travel mode to forward travel mode, passing through the neutral mode in between, to change the direction of travel of machine 10. When the operator moves FNR selector 32 away from one mode and to another, another triggering condition is met. It is contemplated that control system 36 may begin operating in a rate limiting state of operation when the first triggering condition is met, and then the operator applies pressure to accelerator pedal 28, without the second triggering condition being met. As such, control system 36 acts before movement of FNR selector 32, to prevent a jump in machine speed prior to the change in direction. Additionally or alternatively, control system 36 may begin operating in a rate limiting state of operation after both triggering conditions have been met. Entry into the rate limiting state of operation is shown in the time period at approximately 15.5 in a graph 43, where the FNR selector signal goes from F to R. As shown in graph 42, the change in the FNR selector signal causes a sudden decrease of first curve 44.

As noted above, the operator may reapply pressure to acceleration pedal 28 to try to propel machine 10 quickly in the second direction, causing an increase in the requested speed of power source 14. This is shown by a rapidly increasing portion of second curve 46 in the time period between approximately 15.8 and 16.5 in graph 42. Instead of allowing the actual power source speed to increase as quickly as the requested power source speed, control system 36 may set rate limited speeds, represented by a portion of first curve 44, that the actual speeds of power source 14 should not exceed. In graph 42, those rate limited speeds are shown in the period of time between approximately 15.5 and 17.7.

Control system 36 may adjust the speed of power source 14 so that actual power source speed is similar to the rate limited speed. Thus, portions of third curve 48 and first curve 44 are similar in graph 42 in the period of time between approximately 16.4 and 17.6, but with the actual power source speed (third curve 48) below the rate limited speed (first curve 44). Based on the rate limited speed, the actual power source speed increases at a lesser rate than it would have if it followed the requested power source speed (not limited) more closely. The limiting of the actual power source speed helps to ensure that the response time of power source 14 to the change in direction and acceleration request from the operator does not cause unintended or undesired acceleration of machine 10 in the first direction, by giving the transmission assembly 16 enough time to set for propelling machine 10 in the second direction. The rate limiting also helps to ensure that power source 14 does increase in speed, even if the rate of increase is slower, so that when transmission assembly 16 is ready, power source 14 can quickly provide power for driving transmission assembly 16 and propelling machine 10 in the second direction.

Figure 4:
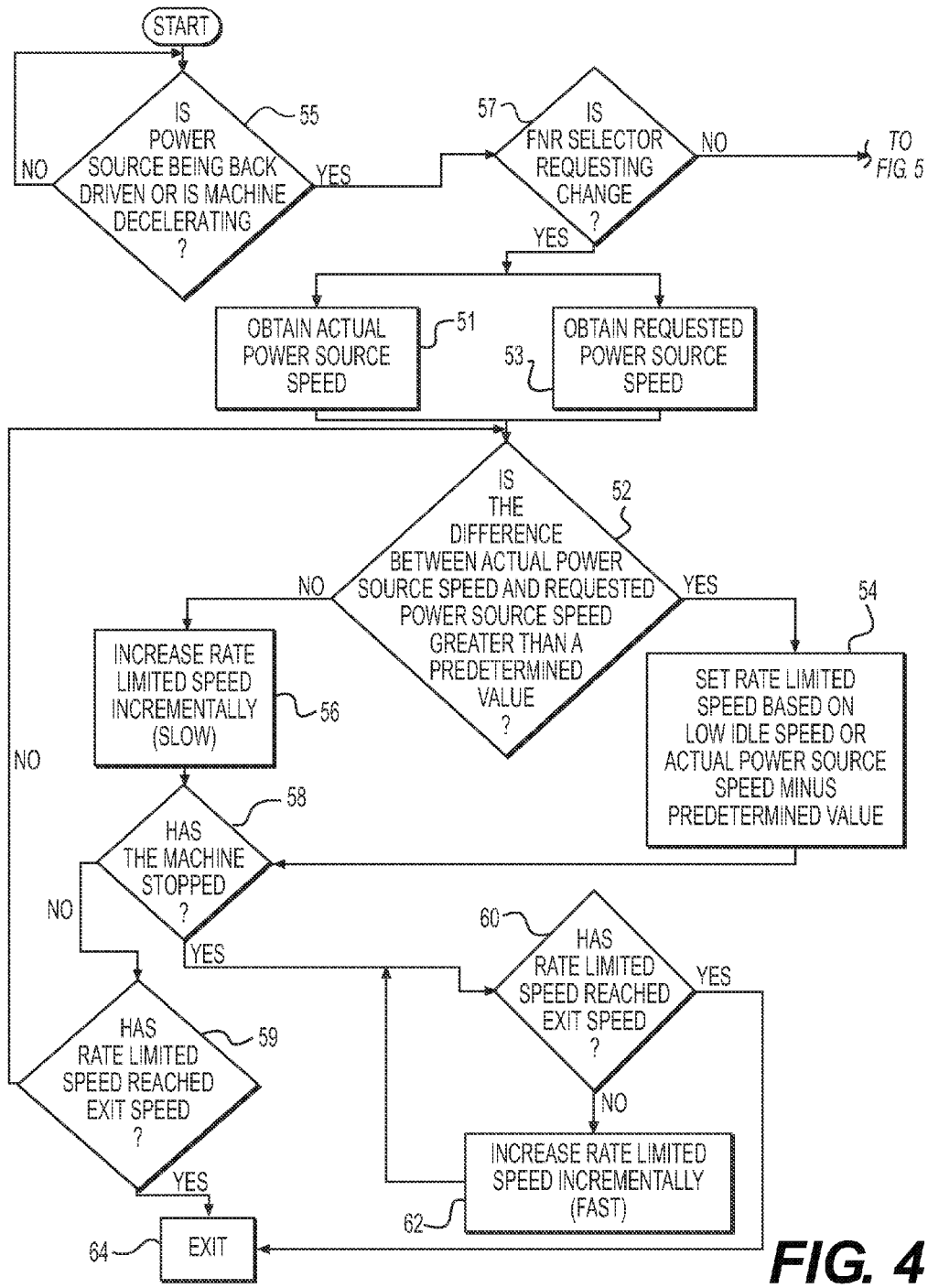
FIGS. 4 and 5 are a flow diagram of a method for engine speed rate limiting, according to one aspect of the present disclosure.
Figure 5:
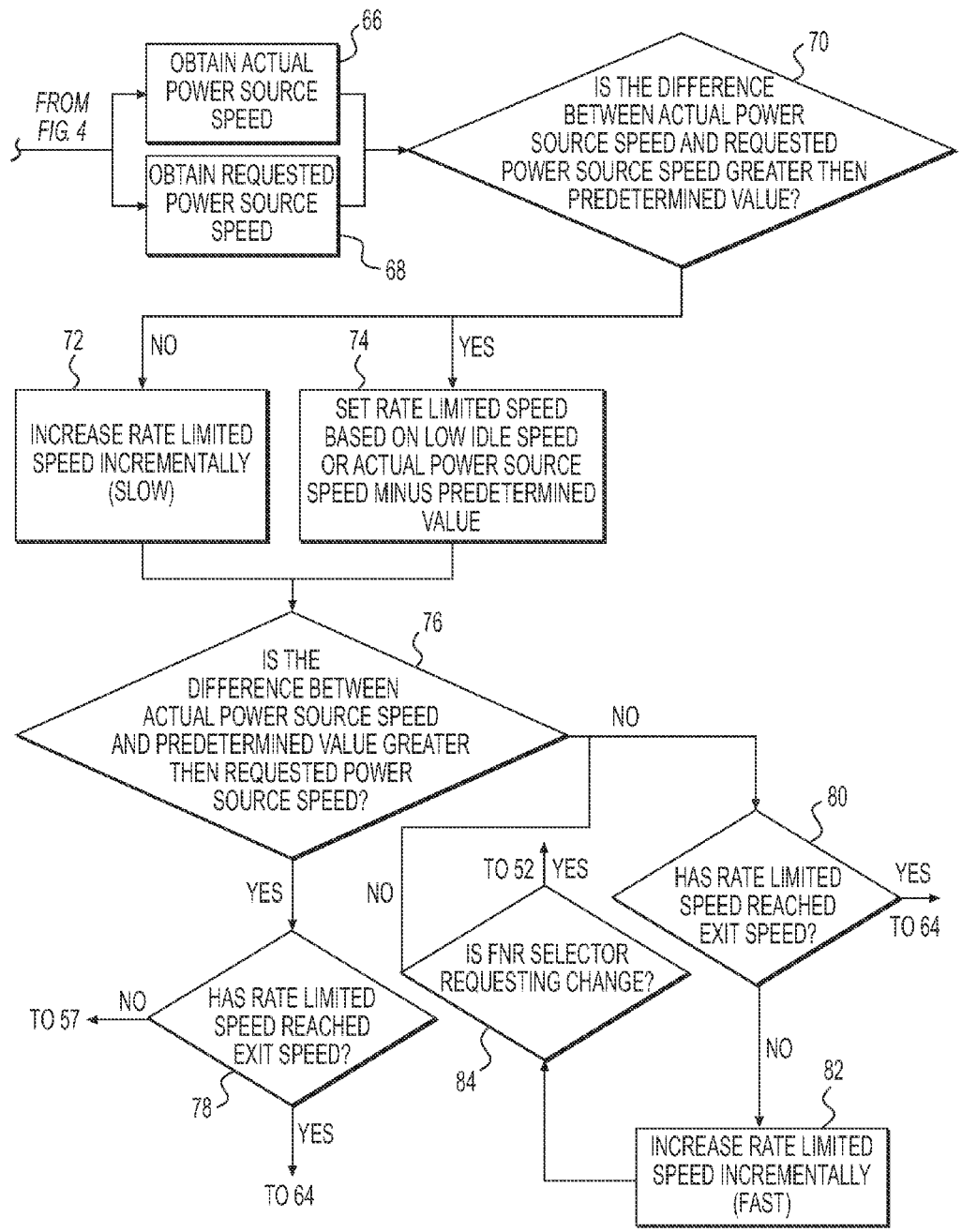

Steps performed by control system 36 for rate limiting (and thereby creating curves 44, 46, and 48) are shown in the flow diagram of FIGS. 4 and 5. The steps may include control system 36 determining whether power source 14 is being back driven or machine 10 is decelerating (step 55). If so, control system 36 determines if FNR selector 32 requests a change (e.g., a change between directions of travel or from a direction of travel to neutral) (step 57). If so, control system 36 obtains the actual power source speed (step 51) and the requested power source speed (step 53), and determines if the actual power source speed minus the requested power source speed is greater than a predetermined value (step 52). If the actual power source speed minus the requested power source speed is greater than the predetermined value, control system 36 sets the rate limited speed to one of a low idle speed (e.g., 800 rpm) for power source 14 or a speed determined by subtracting a predetermined value or offset from the actual power source speed (step 54). The rate limited speed selected by control system 36 may be the higher of the low idle speed and the determined speed. This is shown in the time period between approximately 15.5 and 16 in graph 42, where the rate limited speed is set at the determined speed since the determined speed is greater than low idle speed. If, on the other hand, control system 36 determines that the actual power source speed minus the requested power source speed is less than the predetermined value, control system 36 increases the rate limited speed over time in predetermined slow increments (step 56). This is shown in the time period from approximately 16 to 17.2 in graph 42.

Once transmission assembly 16 is set to propel machine 10 in the second direction, control system 36 may increase the actual speeds of power source 14 at a faster rate, since the risk of unintended or undesired acceleration in the first direction no longer exists. The faster rate for the actual speeds is achieved by increasing the rate of change of the rate limited speeds and the limited requested speeds, as shown by portions of first curve 44. Accordingly, the actual speed may increase at a faster rate corresponding to the limited requested speeds.

The process performed by control system 36 to change the rate may include determining if machine 10 has stopped moving in the first direction (step 58). If not, control system 36 will determine if the rate limited speed has reached a predetermined exit speed (step 59). The predetermined exit speed may be the rate limited speed associated with a "normal" operating condition, or any speed greater than or equal to the requested power source speed. If the rate limited speed has not yet reached the predetermined exit speed, control system 36 will repeat the process from step 52. If the rate limited speed has reached the predetermined exit speed, control system 36 will exit from rate limiting operation (step 64). If control system 36 determines that machine 10 has stopped moving in the first direction, control system 36 may determine if the rate limited speed has reached the predetermined exit speed (step 60). This is shown by a portion of first curve 44 in the period of time approximately 17.7 in graph 42. If so, control system 36 will return to "normal" operation, without rate limiting, by exiting from rate limited operation (step 64). If control system 36 determines that the rate limited speed is less than the predetermined exit speed, control system 36 increases the rate limited speed with fast increments (step 62), until the rate limited speed reaches the predetermined exit speed. This is shown by a portion of first curve 44 in the period of time between approximately 17.2 and 17.7 in graph 42, which produces a corresponding increasing portion of third curve 48. Once rate limited speed reaches the predetermined exit speed, control system 36 will return to "normal" operation without rate limiting (step 64). Control system 36 may go back to rate limiting whenever the trigger conditions are once again fulfilled.

If at step 57, FNR selector 32 is not requesting a change, control system 36 obtains the actual power source speed (step 66) and the requested power source speed (step 68), and determines if the actual power source speed minus the requested power source speed is greater than a predetermined value (step 70). If the actual power source speed minus the requested power source speed is greater than the predetermined value, control system 36 sets the rate limited speed to one of the low idle speed for power source 14 or the speed determined by subtracting a predetermined value or offset from the actual power source speed (step 74). The rate limited speed selected by control system 36 may be the higher of the low idle speed and the determined speed, where the rate limited speed is set at the determined speed since the determined speed is greater than low idle speed. If, on the other hand, control system 36 determines that the actual power source speed minus the requested power source speed is less than the predetermined value, control system 36 increases the rate limited speed over time in predetermined slow increments (step 72).

Control system 36 then determines whether a difference between the actual power source speed and a predetermined value is greater than the requested power source speed (step 76). If so, control system 36 will then determine whether the rate limited speed has reached the predetermined exit speed (step 78). If the rate limited speed has not reached the predetermined exit speed, control system 36 will proceed to step 57 to check again for an FNR selector signal. If the rate limited speed has reached the predetermined exit speed, control system 36 will exit from rate limiting operation (step 64).

If the difference between the actual power source speed and predetermined value is not greater than the requested power source speed at step 76, control system 36 will determine whether the rate limited speed has reached the predetermined exit speed (step 80). If so, control system 36 will proceed to "normal" operation, without rate limiting, by exiting from rate limited operation (step 64). If control system 36 determines that the rate limited speed is less than the predetermined exit speed, control system 36 increases the rate limited speed with fast increments (step 82). Control system 36 will then check whether FNR selector 32 is requesting a change. If not, control system 36 will proceed to step 80. If so, control system 36 will proceed to step 52.

In addition to or as an alternative to changing the direction of travel of machine 10, during operation, the operator may want to stop propelling machine 10 in a direction and put machine 10 in a neutral state. The operator may want to do this so that more of the power generated by power source 14 may be directed to implement assembly 20, so that the mobility of implement assembly 20 may be enhanced. This may allow implement assembly 20 to react more quickly to operator commands. The steps involved are similar to steps 51-84 described above, except that instead of manipulating FNR selector 32 into a travel mode, the operator puts FNR selector 32 in the neutral mode. Putting FNR selector 32 in the neutral mode acts as the second trigger for rate limiting operation. Graph 42 is also applicable, but it should be understood that the sudden decrease in first curve 44, at approximately time 15.5, will be caused by FNR selector being put in the neutral mode, not one of the travel modes. The steps taken by control system 36, with respect to entering, executing, and exiting rate limiting, when switching from a travel mode to the neutral mode, otherwise closely track the steps taken by control system 36 when switching between the travel modes.

In addition to or as an alternative to controlling the power source speed response during a directional change or a change from a directional mode to neutral, it is contemplated that control system 36 may also control the response of transmission assembly 16 to reduce the likelihood of or prevent unintended or undesired acceleration in the wrong direction.

INDUSTRIAL APPLICABILITY

The disclosed control system 36 may have applicability in machines, such as machine 10, and may have may have particular applicability in machines including a power source 14 and a transmission assembly 16 that can back drive power source 14. During operation of a machine 10, the operator may want to change the machine's direction of travel. That is, the operator may want to stop machine 10 from traveling in a first direction and start propelling machine 10 in a second direction substantially opposite the first direction. The operator may perform a direction change by releasing pressure from an acceleration pedal 28, switching an FNR selector 32 from one travel mode to another, and applying pressure to acceleration pedal 28 to attempt to quickly accelerate machine 10 in the second direction. Control system 36 may rate limited the response of power source 14 to the application of pressure to acceleration pedal 28, so that transmission assembly 16 has time to adjust to propel machine 10 in the second direction.

During operation, the operator may also want to stop propelling machine 10 in a direction and put machine 10 in a neutral state. The operator may want to do this so that power generated by power source 14 may be directed to an implement assembly 20. The operator may release pressure from acceleration pedal 28, switch FNR selector 32 from a travel mode to a neutral mode, and apply pressure to acceleration pedal 28 to attempt to quickly actuate implement assembly 20. Control system 36 may rate limited the response of power source 14 to the application of pressure to acceleration pedal 28, so that transmission assembly 16 has time to adjust from a state where transmission assembly 16 propels machine 10.

By performing rate limiting in the manner described in the present disclosure, control system 36 helps to keep machine 10 operating smoothly when the operator switches travel directions and/or when the operator switches from a travel direction to neutral operation. Also, unintended or undesired acceleration of machine 10 is avoided, which improves machine performance, and reduces repositioning of machine 10 that would otherwise be required.

What is claimed is:

1. A machine control system, comprising:
a processor configured to communicate with:
an operator interface including an acceleration pedal and a forward-neutral-reverse selector,
a power source, and
a transmission assembly;
the processor being configured to:
obtain a request from the forward-neutral-reverse selector,
provide an instruction for adjusting operation of the transmission assembly in response to the forward-neutral-reverse selector request,
obtain a request for an increase in a speed of the power source at a first rate, the power source speed request being based on a position of the acceleration pedal, and
provide an instruction for increasing the power source speed at a second rate slower than the first rate to provide the transmission assembly with time to respond to the forward-neutral-reverse selector request by switching from one of a forward travel state, neutral state, and reverse travel state, to another of the forward travel, neutral, and reverse travel states.

2. The machine control system of claim 1, wherein obtaining the forward-neutral-reverse selector request includes obtaining a request to switch between a forward travel mode and a reverse travel mode.

3. The machine control system of claim 2, wherein providing the transmission assembly instruction includes providing an instruction for the transmission assembly to switch between the forward travel state and the reverse travel state.

4. The machine control system of claim 1, wherein obtaining the forward-neutral-reverse selector request includes obtaining a request to switch from a travel mode to a neutral mode.

5. The machine control system of claim 4, wherein providing the transmission assembly instruction includes providing an instruction for the transmission assembly to switch between one of the forward travel and reverse travel states and the neutral state.

6. The machine control system of claim 1, wherein providing the power source speed instruction includes providing an instruction to increase the power source speed incrementally.

7. The machine control system of claim 1, wherein providing the power source speed instruction includes providing an instruction to increase the power source speed at a third rate faster than the second rate.

8. The machine control system of claim 7, wherein the third rate is slower than the first rate.

9. A machine control method for a machine including an operator interface with an acceleration pedal and a forward-neutral-reverse selector, a power source, and a transmission assembly, the method comprising:
obtaining a request from the forward-neutral-reverse selector;
adjusting operation of the transmission assembly in response to the forward-neutral-reverse selector request;
obtaining a request for an increase in a speed of the power source at a first rate, the power source speed request being based on a position of the acceleration pedal; and
limiting a response to the power source speed request by increasing the power source speed at a second rate slower than the first rate until the machine stops.

10. The machine control method of claim 9, wherein obtaining the forward-neutral-reverse selector request includes obtaining a request for the machine to move between forward and reverse travel modes.

11. The machine control method of claim 9, wherein obtaining the forward-neutral-reverse selector request includes obtaining a request for the machine to move between a travel mode and a neutral mode.

12. The machine control method of claim 9, wherein increasing the power source speed at the second rate includes increasing the power source speed incrementally.

13. The machine control method of claim 9, wherein limiting the response to the power source speed request includes increasing the power source speed at a third rate faster than the second rate after the machine has stopped.

14. The machine control method of claim 9, wherein the third rate is slower than the first rate.

15. A machine, comprising:
an operator interface including:
an acceleration pedal, and
a forward-neutral-reverse selector;
a power source;
a transmission assembly; and
a control system configured to:
obtain a command from the forward-neutral-reverse selector,
adjust operation of the transmission assembly in response to the forward-neutral-reverse selector command,
obtain a request for an increase in a speed of the power source at a first rate, the request being based on a position of the acceleration pedal, and
increase the speed of the power source at a second rate slower than the first rate until the machine stops.

16. The machine of claim 15, wherein the forward-neutral-reverse selector command includes a command for the machine to change direction.

17. The machine of claim 15, wherein the forward-neutral-reverse selector command includes a command for the machine to enter a neutral state.

18. The machine of claim 15, wherein increasing the power source speed at the second rate incrementally increases the power source speed.

19. The machine of claim 15, further including increasing the speed of the power source at a third rate faster than the second rate and slower than the first rate after the machine has stopped.

20. The machine of claim 15, wherein the transmission assembly is configured to back drive the power source during deceleration of the machine.

* * * * *